United States Patent Office 2,963,458
Patented Dec. 6, 1960

2,963,458

VINYL CHLORIDE POLYMER PLASTICIZED WITH α-PHOSPHONATE COMPOUNDS

Daniel Swern, Philadelphia, Pa., assignor to the United States of America as represented by the Secretary of Agriculture No Drawing. Filed Jan. 14, 1958, Ser. No. 708,957

5 Claims. (Cl. 260—30.6)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to new classes of organic phosphorus containing compounds. More particularly, this invention relates to α-phosphonates having the general Formula I wherein R is H or

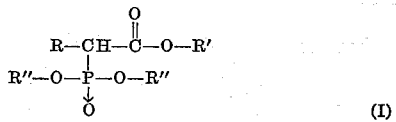

(I)

a normal alkyl radical containing two through 16 carbon atoms, R' is a methyl, ethyl, n-butyl, n-hexyl, 2-ethylhexyl, phenyl or vinyl radical, and R" is a methyl, ethyl, n-butyl or n-hexyl radical, and to hydrolysis products of certain of these α-phosphonates.

One object of this invention is to prepare long-chain trialkyl α-phosphonates, preferably containing a total of at least 15 carbon atoms, for use as plasticizers for polymers such as poly(vinyl chloride) and copolymers of vinyl chloride with vinyl acetate. The term "long-chain" appears appropriate as the majority of trialkyl α-phosphonates contain one radical with ten to sixteen carbon atoms and all compounds in this group have at least one radical with six or more carbon atoms.

Another object of this invention is to prepare trialkyl α-phosphonates which can be partially hydrolyzed to produce α-phosphonates, or completely hydrolyzed to α-phosphonic acids useful in making lubricant greases and as adjuncts to detergent formulations, respectively.

A further object is to prepare vinyl esters of alkyl α-phosphonates which are useful in making homopolymers and in making copolymers with vinyl acetate, vinyl chloride and other suitably reactive monomers. The copolymers are internally plasticized, thus requiring little or no external plasticizers.

We have discovered that in the preparation of plasticizers having the general Formula I wherein R' is an alkyl radical certain relationships between R, R' and R" are important. For example, when R' and R" are methyl or ethyl, then R should contain at least ten or seven carbon atoms, respectively, otherwise the products are too volatile for use as plasticizers. When R' and R" are n-butyl or higher molecular weight alkyl or aryl groups, R can be methyl or hydrogen, although for convenience in preparation and for low volatility in the product for use as a plasticizer we prefer that R contain at least four carbon atoms. When R contains more than sixteen carbon atoms the volatility of the products is so low that they become difficult to isolate and purify by high vacuum distillation, or even by molecular distillation, especially when R' or R" is n-butyl or higher molecular weight.

Based on studies with over one hundred compounds the longest unsubstituted saturated chain which can be present in a plasticizer to be compatible at the 35% level in poly(vinyl chloride) is about $C_{12}$. We have discovered, however, that certain trialkyl α-phosphonates of this invention with an uninterrupted chain of at least sixteen carbon atoms are primary, efficient low temperature plasticizers for poly(vinyl chloride).

When R' of the general Formula I is a vinyl group the compounds become important as monomers for the preparation of internally plasticized polymers. In these compounds, referring to the general Formula I, R may be hydrogen or an alkyl radical, and R" may be alkyl or aryl radicals.

The α-phosphonates of this invention are prepared in 30 to 96% yields by heating a trialkyl phosphite with the alkyl, aryl, or vinyl ester of an α-bromo fatty acid as illustrated by the following equation:

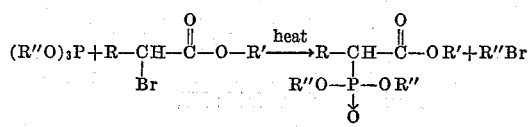

The trialkyl phosphites were commercial materials which were fractionally distilled before use: trimethyl phosphite, B.P. 107–9° C.; triethyl phosphite, B.P. 151–5°; and tri-n-butyl phosphite, B.P. 120–4° at 9 mm. Hg pressure, and tri-n-hexyl phosphite, B.P. 123–6° at 0.15 mm. Hg pressure. Hence R" is a methyl, ethyl, n-butyl or n-hexyl radical. The methyl or ethyl esters of the α-bromo acids were prepared by refluxing the acid with a five mole excess of absolute methanol or ethanol using an acid catalyst. After several water washes followed by drying, the crude esters were fractionally distilled in an all-glass apparatus. The vinyl α-bromo esters were prepared from the corresponding α-bromo acids by reaction with vinyl acetate using sulfuric acid-mercuric salt as catalyst. The other alkyl α-bromo esters were prepared in the conventional way from the alcohol and α-bromo acid in the presence of strong acid catalyst with azeotropic removal of water, followed by fractional distillation. Phenyl α-bromo-stearate was prepared from phenol and α-bromostearoyl chloride in pyridine, in the usual way. This product was also distilled. The esters of α-bromo fatty acids prepared and data pertaining to these compounds are presented in Table I.

TABLE I

*Esters of α-bromo fatty acids*

| | B.P. | | $n_D^{30}$ | Br. percent | |
|---|---|---|---|---|---|
| | ° C. | Mn. | | Calcd. | Found |
| Ethyl α-bromopelargonate | 75 | 0.5 | 1.4498 | 30.1 | 30.0 |
| Ethyl α-bromolaurate | 101 | 0.1 | 1.4531 | 26.0 | 25.4 |
| Ethyl α-bromomyristate | 128–33 | 0.1 | 1.4550 | 23.8 | 23.6 |
| Ethyl α-bromopalmitate | 163–6 | 0.2 | 1.4559 | | |
| Ethyl α-bromostearate | 172–4 | 0.2 | 1.4570 | 20.4 | 20.1 |
| Methyl α-bromolaurate | 105–7 | 0.05 | 1.4551 | 27.3 | 27.3 |
| n-Butyl α-bromocaprylate | 99–101 | 0.1 | 1.4489 | 28.6 | 28.4 |
| n-Butyl α-bromolaurate | 133 | 0.3 | 1.4535 | 23.8 | 23.9 |
| n-Butyl α-bromostearate | 150–60 | 0.3 | 1.4573 | | |
| n-Hexyl α-bromocaproate | 107–8 | 1.6 | 1.4505 | 28.6 | 28.6 |
| 2-ethylhexyl α-bromostearate | 187–91 | 0.3 | 1.4596 | 16.8 | 15.1 |
| Phenyl α-bromostearate | 218–230 | 0.65 | 1.485 | | |
| Vinyl bromoacetate | 50–51 | 9.0 | 1.4692 | | |
| Vinyl α-bromobutyrate | 63–65 | 9.5 | 1.4413 | | |
| Vinyl α-bromohexanoate | 84–86 | 2.8 | | | |
| Vinyl α-bromodecanoate | 92–94 | 0.2 | 1.4608 | 28.8 | 28.3 |
| Vinyl α-bromolaurate | 116–117 | 0.2 | 1.4617 | 26.2 | 26.3 |
| Vinyl α-bromomyristate | 137–139 | 0.25 | 1.4627 | 24.0 | 23.8 |
| Vinyl α-bromopalmitate | 165–167 | 0.15 | 1.4633 | 22.1 | 22.3 |
| Vinyl α-bromostearate | 190–192 | 0.1 | 1.4635 | 20.5 | 20.2 |

EXAMPLES 1 TO 15

A typical method of preparation of trialkyl and aryl dialkyl α-phosphonates is as follows: one mole of alkyl or aryl ester of an α-bromo carboxylic acid was heated at 160–190° C. with two moles of trialkyl phosphite in an atmosphere of nitrogen. The alkyl bromide formed during the reaction was swept out and collected in a Dry Ice trap. The reaction was stopped when the weight of alkyl bromide became constant (usually 4 to 5 hours). The entire reaction mixture was then fractionally distilled to recover unconsumed trialkyl phosphite and to isolate the pure α-phosphonate. The trialkyl or aryl dialkyl α-phosphonates, further identified and characterized by the data presented in Table II, are high-boiling, colorless, odorless, thermally stable liquids, insoluble in water and soluble in organic solvents.

The trialkyl α-phosphonates of the general Formula I having relationships of R, R', and R" as previously discussed, are efficient, primary plasticizers for poly(vinyl chloride) and copolymers of vinyl chloride with vinyl acetate. At the 35% level they impart good mechanical properties to the plasticized material and they are good low temperature plasticizers. Evaluation data for some of these α-phosphonates as plasticizers are presented in Table III. Comparative data for some commercial plasticizers are also included in Table III.

low temperature properties, in most instances they give superior mechanical properties, and their volatility characteristics are adequate. Examples 5, 12 and 13 illustrate the first time a compound containing an unsubstituted saturated chain of at least 16 carbon atoms is used as a primary, efficient low temperature plasticizer.

In addition to their use as plasticizers, the trialkyl α-phosphonates are also useful as intermediates for the preparation of α-dialkylphosphonocarboxylic acids and α-phosphonocarboxylic acids. Upon partial or complete hydrolysis of trialkyl α-phosphonates, the phosphorus-containing group remains attached to the fatty acid chain. The result of selective hydrolysis of the carboxylic ester group with dilute base is an α-dialkylphosphonocarboxylic acid, represented by the Formula II, and complete hydrolysis of the three ester groups of a trialkyl α-phosphonate by refluxing with 20–35% hydrochloric acid is a tribasic α-phosphonocarboxylic acid, represented by the Formula III.

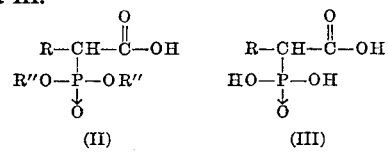

In a typical procedure for the preparation of com-

TABLE II

Trialkyl α-phosphonates

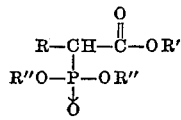

| Ex. | Compound | Yield, Percent | B.P. °C. | B.P. Mm. | Phosphorus, Percent Calcd. | Phosphorus, Percent Found | Carbon, Percent Calcd. | Carbon, Percent Found | Hydrogen, Percent Calcd. | Hydrogen, Percent Found | $n_D^{33}$ | $d_4^{30}$ |
|---|---|---|---|---|---|---|---|---|---|---|---|---|
| 1 | R=CH₃—(CH₂)₆; R'=R"=C₂H₅ | 88 | 168 | 4 | 9.61 | 9.81 | 55.9 | 54.8 | 9.65 | 9.58 | 1.4359 | 0.9994 |
| 2 | R=CH₃—(CH₂)₉; R'=R"=C₂H₅ | 80 | 153–6 | 0.1 | 8.50 | 8.34 | 59.3 | 58.3 | 10.2 | 10.6 | 1.4398 | 0.9782 |
| 3 | R=CH₃—(CH₂)₁₁; R'=R"=C₂H₅ | 82 | 173–6 | 0.1 | 7.89 | 7.74 | 61.2 | 60.6 | 10.5 | 10.6 | 1.4420 | 0.9658 |
| 4 | R=CH₃—(CH₂)₁₃; R'=R"=C₂H₅ | 96 | 185–7 | 0.2 | 7.37 | 7.07 | 62.8 | 62.5 | 10.8 | 11.2 | 1.4432 | 0.9562 |
| 5 | R=CH₃—(CH₂)₁₅; R'=R"=C₂H₅ | 76 | 185–7 | 0.2 | 6.90 | 6.91 | 64.3 | 64.3 | 11.0 | 10.6 | 1.4452 | 0.9497 |
| 6 | R=CH₃—(CH₂)₉; R'=C₂H₅; R"=n-C₄H₉ | 73 | 210 | 0.18 | 7.37 | 7.18 | 62.8 | 61.9 | 10.8 | 10.7 | 1.4413 | 0.9547 |
| 7 | R=CH₃—(CH₂)₉; R'=C₂H₅; R"=n-C₆H₁₃ | 53 | 173 | 0.25 | 6.50 | 6.37 | 65.5 | 65.1 | 11.2 | 11.3 | 1.4440 | 0.9394 |
| 8 | R=CH₃—(CH₂)₉; R'=R"=n-C₄H₉ | 75 | 182 | 0.6 | 6.91 | 7.15 | 64.3 | 64.3 | 11.0 | 10.7 | 1.4426 | 0.9462 |
| 9 | R=CH₃—(CH₂)₃; R'=R"=n-C₆H₁₃ | 40 | 139 | 0.15 | 6.91 | 7.45 | 64.3 | 63.4 | 11.0 | 10.7 | 1.4405 | 0.9344 |
| 10 | R=CH₃—(CH₂)₉; R'=R"=CH₃ | 61 | 156 | 0.7 | 9.61 | 9.06 | 55.9 | 55.4 | 9.69 | 9.71 | 1.4440 | 1.0203 |
| 11 | R=CH₃—(CH₂)₉; R'=n-C₄H₉; R"=C₂H₅ | 89 | 186 | 0.3 | 7.89 | 7.79 | 61.2 | 60.5 | 10.5 | 10.5 | 1.4416 | 0.9644 |
| 12 | R=CH₃—(CH₂)₁₅; R'=2-ethylhexyl; R"=C₂H₅ | 73 | 215 | 0.4 | 5.82 | 5.26 | 67.6 | 67.3 | 11.5 | 11.7 | 1.4507 | 0.9326 |
| 13 | R=CH₃—(CH₂)₁₅; R'=n-C₄H₉; R"=C₂H₅ | 79 | 195 | 0.4 | 6.50 | 6.23 | 65.5 | 65.0 | 11.2 | 11.1 | 1.4466 | 0.9402 |
| 14 | R=CH₃—(CH₂)₅; R'=n-C₄H₉; R"=n-C₆H₁₃ | 30 | 163–71 | 0.3 | 6.91 | 6.68 | 64.3 | 63.9 | 11.0 | 11.2 | 1.4427 | 0.9438 |
| 15 | R=CH₃—(CH₂)₁₅; R'=Phenyl; R"=C₂H₅ | 80 | 210–35 | 0.4 | | | | | | | 1.466 | |

TABLE III

Comparison of properties of vinyl copolymer (95:5 vinyl chloride:vinyl acetate) plasticized with trialkyl α-phosphonates and commercial plasticizers [1]

| Example | Trialkyl α-phosphonate | Tensile strength, lb./sq. in. | Elongation, percent | Modulus, 100% lb./sq. in. | Clash-Berg T-200, ° C. | Volatility, weight loss, percent |
|---|---|---|---|---|---|---|
| 5 | Triethyl α-phosphonostearate | 2,735 | 330 | 1,560 | −37 | 1.3 |
| 6 | Ethyl (α-dibutylphosphono)laurate | 2,570 | 350 | 1,220 | −42 | 1.9 |
| 7 | Ethyl (α-dihexylphosphono)laurate | 2,520 | 290 | 1,390 | −47 | 1.1 |
| 8 | Tributyl α-phosphonolaurate | 2,800 | 270 | 1,550 | −43 | 0.8 |
| 9 | Trihexyl α-phosphonocaproate | 2,550 | 335 | 1,250 | −55 | 7.3 |
| 11 | Butyl (α-diethylphosphono)laurate | 2,200 | 380 | 940 | −45 | 5.1 |
| 12 | 2-ethylhexyl (α-diethylphosphono)stearate | 2,470 | 340 | 1,395 | −41 | 4.7 |
| 13 | Butyl (α-diethylphosphono)stearate | 2,470 | 370 | 1,240 | −33 | 1.6 |
| | Tricresyl phosphate | 3,610 | 270 | 2,015 | −1 | 0.3 |
| | Triphenyl phosphate | 3,290 | 320 | 1,450 | −8 | |
| | Cresyl diphenyl phosphate | 3,335 | 265 | 1,610 | −7 | 1.1 |
| | Alkylarylphosphate | 2,560 | 310 | 1,215 | −28 | 2.3 |
| | Di(2-ethylhexyl) phthalate | 2,930 | 370 | 1,390 | −28 | 1.1 |

[1] Recipe: Copolymer 63; plasticizer 35; stabilizers and mold release agents 2.

Inspection of the data reveals that these trialkyl α-phosphonates are superior to some of the most important commercial plasticizers because they impart excellent pounds of the Formula II approximately 0.5 to 1 gram of a triethyl α-phosphonate was refluxed for one hour with 25 ml. of 0.2 N potassium hydroxide in 95% ethanol.

The solution was acidified with hydrochloric acid and the reaction mixture was evaporated to dryness. The residue was washed several times with ether and the combined ether solutions were filtered to separate insoluble salt. Evaporation of the ether from the filtrate yielded the α-diethylphosphonocarboxylic acid, characterized by its neutral equivalent. The compounds of Examples 1 to 5

EXAMPLES 16 TO 23

Vinyl α-dialkylphosphonates were prepared by the reaction of appropriate trialkyl phosphites with the vinyl esters of α-bromocarboxylic acids of Table I using essentially the same procedures described for the preparation of the compounds of Examples 1 to 15. The characteristics of these vinyl esters are summarized in Table V.

TABLE V

*Vinyl α-dialkylphosphonates*

| Example | Compound | Yield, percent | B. P. | | Phosphorus, percent | | Carbon, percent | | Hydrogen, percent | | $n_D^{30}$ | $n_4^{30}$ |
|---|---|---|---|---|---|---|---|---|---|---|---|---|
| | | | °C. | mm. | Calcd. | Found | Calcd. | Found | Calcd. | Found | | |
| 16 | R=H; R'=Vinyl; R''=C₂H₅ | 41 | 98-100 | 0.25 | 13.94 | 14.22 | 43.2 | 42.8 | 6.8 | 7.0 | 1.4348 | 1.1245 |
| 17 | R=CH₃—CH₂; R'=Vinyl; R''=C₂H₅ | 34 | 133-134 | 7.0 | | | | | | | 1.4368 | 1.0761 |
| 18 | R=CH₃—(CH₂)₃; R'=Vinyl; R''=C₂H₅ | 38 | 158-159 | 7.8 | | | | | | | 1.4370 | 1.0436 |
| 19 | R=CH₃—(CH₂)₇; R'=Vinyl; R''=C₂H₅ | 62 | 146-8 | 0.15 | 9.26 | 8.76 | 57.5 | 57.3 | 9.4 | 9.7 | 1.4423 | 0.9990 |
| 20 | R=CH₃—(CH₂)₉; R'=Vinyl; R''=C₂H₅ | 47 | 152-3 | 0.05 | 8.55 | 8.73 | 59.6 | 59.1 | 9.7 | 9.7 | 1.4443 | 0.9836 |
| 21 | R=CH₃—(CH₂)₁₁; R'=Vinyl; R''=C₂H₅ | 39 | 172-4 | 0.15 | 7.93 | 7.98 | 61.5 | 60.7 | 10.1 | 10.0 | 1.4459 | 0.9736 |
| 22 | R=CH₃—(CH₂)₁₃; R'=Vinyl; R''=C₂H₅ | 73 | 200-2 | 0.10 | 7.40 | 7.58 | 63.1 | 62.5 | 10.4 | 10.3 | 1.4478 | 0.9659 |
| 23 | R=CH₃—(CH₂)₁₅; R'=Vinyl; R''=C₂H₅ | 43 | 204-6 | 0.05 | 6.94 | 7.33 | 64.5 | 63.2 | 10.6 | 10.9 | | | were hydrolyzed according to this procedure and the neutralization equivalents of the respective α-diethylphosphonocarboxylic acids are presented in Table IV.

TABLE IV

*Neutralization equivalent of α-diethylphosphonomonocarboxylic acids obtained by partial hydrolysis of triethyl α-phosphonates*

| Triethyl α-phosphonate used as starting material | Neut. equiv. of isolated acid | |
|---|---|---|
| | Calcd. | Found |
| Table I, Example 1 | 294 | 297 |
| Table I, Example 2 | 336 | 344 |
| Table I, Example 3 | 364 | 336 |
| Table I, Example 4 | 392 | 396 |
| Table I, Example 5 | 420 | 417 |

Complete hydrolysis of trialkyl α-phosphonates to give compounds represented by Formula III is illustrated as follows: Triethyl α-phosphonolaurate (Table II, Example 2) and triethyl α-phosphonostearate (Table II, Example 5) were refluxed for 18-24 hours with a large excess of 20-35% hydrochloric acid. The reaction mixtures were transferred to evaporating dishes and evaporated to dryness. The residues were hard brittle solids with neutralization equivalents (thymolphthalein indicator) of 101 and 129, respectively (calculated equivalents for the tribasic acids, α-phosphonolauric acid, 94; and α-phosphonostearic acid, 122).

The partially hydrolyzed trialkyl phosphonates are useful in the preparation of lubricant greases and the tribasic α-phosphonocarboxylic acids are useful in detergent formulations.

I claim:

1. A plastic composition comprising a synthetic resin selected from the group consisting of poly(vinyl chloride) and a copolymer of vinyl chloride and vinyl acetate containing predominantly vinyl chloride and, as a plasticizer therefor, a compound represented by the general formula:

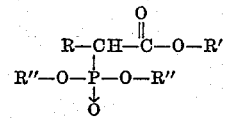

wherein R is a member of the group consisting of normal alkyl radicals containing 14 and 16 carbon atoms, R' is selected from the group consisting of methyl, ethyl, n-butyl, n-hexyl, 2-ethylhexyl and phenyl, and R'' is selected from the group consisting of methyl, ethyl, n-butyl and n-hexyl.

2. A composition as in claim 1 in which the plasticizer is triethyl α-phosphonostearate.

3. A composition as in claim 1 in which the plasticizer is ethyl (α-dibutylphosphono)laurate.

4. A composition as in claim 1 in which the plasticizer is ethyl (α-dihexylphosphono)laurate.

5. A composition as in claim 1 in which the plasticizer is 2-2-ethylhexyl (α-diethylphosphono) stearate.

References Cited in the file of this patent

UNITED STATES PATENTS

| 2,710,847 | Ham | June 14, 1955 |
| 2,739,952 | Linville | Mar. 27, 1956 |
| 2,754,319 | Johnston | July 10, 1956 |
| 2,754,320 | Johnston | July 10, 1956 |